United States Patent
Wen et al.

(10) Patent No.: US 10,180,363 B2
(45) Date of Patent: Jan. 15, 2019

(54) PRESSURE DETECTION STRUCTURE AND TERMINAL DEVICE

(71) Applicant: SHENZHEN GOODIX TECHNOLOGY CO., LTD., Shenzhen, Guangdong (CN)

(72) Inventors: Dafei Wen, Guangdong (CN); Rui Ran, Guangdong (CN)

(73) Assignee: SHENZHEN GOODIX TECHNOLOGY CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/674,782

(22) Filed: Aug. 11, 2017

(65) Prior Publication Data

US 2017/0343428 A1 Nov. 30, 2017

Related U.S. Application Data

(63) Continuation of application No. PCT/CN2016/103476, filed on Oct. 27, 2016.

(30) Foreign Application Priority Data

Oct. 29, 2015 (CN) .................... 2015 2 0856106 U (51) Int. Cl.
*G01L 1/00* (2006.01)
*G01L 1/14* (2006.01)
(Continued)

(52) U.S. Cl.
CPC .............. *G01L 1/142* (2013.01); *G06F 3/041* (2013.01); *G06F 3/044* (2013.01); *G06F 3/0414* (2013.01); *G06F 2203/04105* (2013.01)

(58) Field of Classification Search
CPC ....... G01L 1/142; G06F 3/041; G06F 3/0414; G06F 3/044; G06F 2203/04105
(Continued)

(56) References Cited

U.S. PATENT DOCUMENTS 9,501,195 B1* 11/2016 Kim .................... G02F 1/13338
2008/0169589 A1* 7/2008 Sperry .................. B33Y 30/00
264/494
(Continued)

FOREIGN PATENT DOCUMENTS

CN 203644006 U 6/2014
CN 104423739 A 3/2015
(Continued)

OTHER PUBLICATIONS

State Intellectual Property Office of the P.R. China (ISR/CN), "International Search Report for PCT/CN2016/103476", China, dated Dec. 28, 2016.

*Primary Examiner* — Masoud H Noori
(74) *Attorney, Agent, or Firm* — Heslin Rothenberg Farley & Mesiti P.C.

(57) ABSTRACT

The present application discloses a pressure detection structure and a terminal device. The pressure detection structure includes a cover, a display screen, a pressure sensor and a middle frame, the display screen and the cover being sequentially stacked in the middle frame from bottom to top; wherein: the pressure sensor is fixed to the display screen; the display screen includes a lower glass layer, an LED light emitting layer and an upper glass layer which are sequentially stacked from bottom to top; and the pressure sensor is positioned beneath the lower glass layer. Thus, the tolerance to be controlled mainly lies in the thickness of the gap layer inside the display screen, and the flatness of the pressure sensor. Hence, the assembling tolerance is reduced, and the stability, reliability and consistency of pressure detection by the terminal device are improved.

20 Claims, 6 Drawing Sheets

(51) Int. Cl.
   *G06F 3/041*      (2006.01)
   *G06F 3/044*      (2006.01)
(58) Field of Classification Search
   USPC .................................................. 73/862.626
   See application file for complete search history.

(56) References Cited

U.S. PATENT DOCUMENTS

| | | | |
|---|---|---|---|
| 2011/0001706 A1* | 1/2011 | Sanford | ............... G06F 3/0412 |
| | | | 345/173 |
| 2013/0278556 A1 | 10/2013 | Conway et al. | |
| 2016/0085336 A1* | 3/2016 | Kim | ....................... G06F 3/044 |
| | | | 345/174 |

FOREIGN PATENT DOCUMENTS

| | | |
|---|---|---|
| CN | 105117080 A | 12/2015 |
| CN | 105446538 A | 3/2016 |
| CN | 205121517 U | 3/2016 |
| CN | 205302238 U | 6/2016 |
| CN | 205384588 U | 7/2016 |
| CN | 205384592 U | 7/2016 |

\* cited by examiner

PRESSURE DETECTION STRUCTURE AND TERMINAL DEVICE

CROSS-REFERENCE TO RELATED APPLICATIONS

This application is a continuation of International Patent Application No. PCT/CN2016/103476, with an international filing date of Oct. 27, 2016, designating the United States, now pending, which is based on Chinese Patent Application No. 201520856106.1, filed Oct. 29, 2015. The contents of these specifications are incorporated herein by reference.

TECHNICAL FIELD

The present application relates to the technical field of electronics, and in particular, relates to a pressure detection structure and a terminal device.

BACKGROUND

Figure 1A:
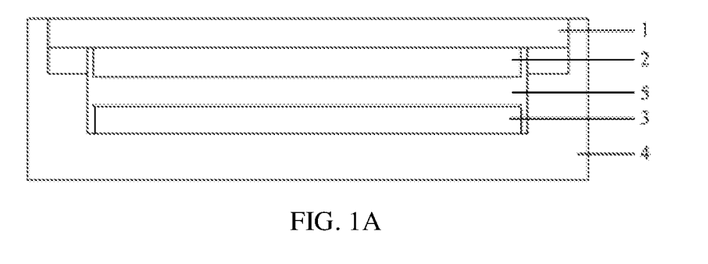
FIG. 1A is a schematic structural diagram of a pressure detection structure in the related art.
Figure 1B:
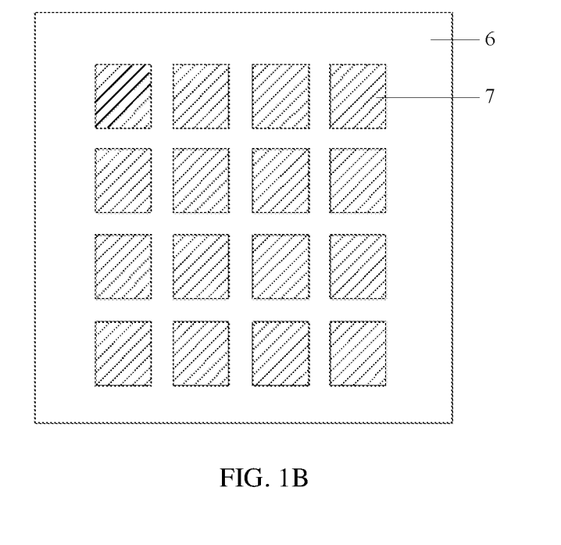
FIG. 1B is a schematic structural diagram of a pressure sensor in FIG. 1.
Figure 1C:
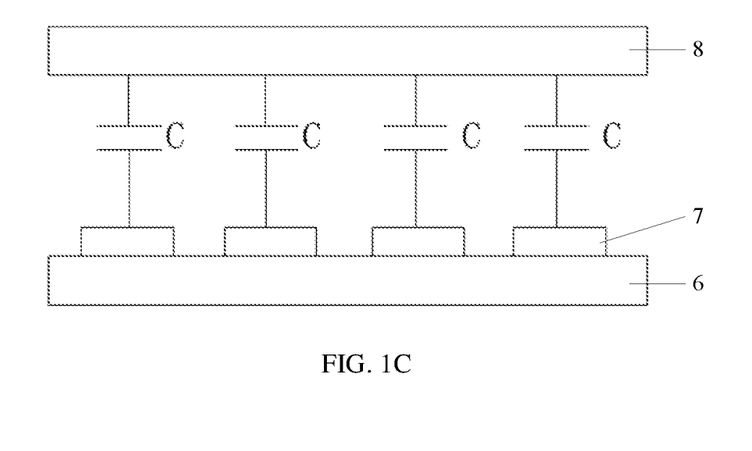
FIG. 1C is a schematic structural diagram of capacitance formation between a detection electrode and a reference electrode of the pressure sensor.
Figure 1D:
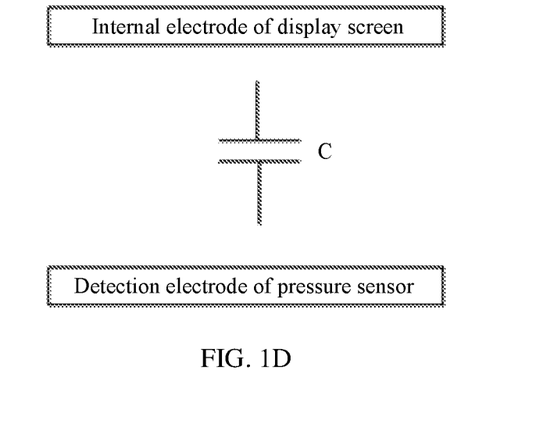
FIG. 1D is a schematic capacitance structural diagram of the pressure detection structure in the related art.

At present, terminal devices (for example, mobile phones) detect pressure caused by touches of users' hands by using a pressure sensor generally. As illustrated in FIG. 1A, a conventional pressure detection structure of a terminal device includes a cover 1, a middle frame 4, a display screen 2 and a pressure sensor 3. The pressure sensor 3, the display screen 2 and the cover 1 are sequentially stacked in the middle frame 4 from bottom to top. The pressure sensor 3 is fixed to a bottom of the middle frame 4, and a gap 5 is formed between the pressure sensor 3 and the display screen 2. Generally, the pressure sensor 3 is a capacitive sensor, and as illustrated in FIG. 1B, includes a substrate 6 and detection electrodes 7 arranged in a matrix form on the substrate 6. The detection electrodes 7 of the pressure sensor 3 and an external reference electrode form the capacitances as illustrated in FIG. 1C. Each of the detection electrodes 7 on the substrate 6 forms a capacitance C with a reference electrode 8. In the pressure detection structure as illustrated in FIG. 1A, the reference electrode is an internal electrode of the display screen, wherein the structure of the capacitor thereof is as illustrated in FIG. 1D. Pressure detection is practiced as follows: when a force is applied to the cover 1, the cover 1 deforms, such that the spacing between the pressure sensor 3 and the display screen is changed, and thus the capacitance between the pressure sensor 3 and the reference electrode is changed. Accordingly, the pressure is identified according to the variation quantity of the capacitance.

As seen from the implementation principle, a detection spacing between the display screen 2 and the pressure sensor 3 needs to be well controlled, wherein the detection spacing is the gap 5 as illustrated in FIG. 1A. However, the gap 5 is subject to complicated and more working processes and masses of parts to be assembled during the mass production, and thus the assembling is subject to a great tolerance. In addition, the tolerance of the spacing between the display screen 2 and the middle frame 4 of different machines may affect consistency of the machines, and thus the user experience is different between the different machines. Moreover, falloff and extrusion-caused deformation of the entire product may simply change the gap, thereby lowering reliability of the products.

SUMMARY

The present application is mainly intended to provide a pressure detection structure and a terminal device, to improve stability, reliability and consistency of pressure detection by the terminal device.

To achieve the above objective, the present application provides a pressure detection structure, including a cover, a display screen, a pressure sensor and a middle frame, the display screen and the cover being sequentially stacked in the middle frame from bottom to top; wherein the pressure sensor is fixed to the display screen; the display screen includes a lower glass layer, an LED light emitting layer and an upper glass layer which are sequentially stacked from bottom to top; and the pressure sensor is positioned beneath the lower glass layer.

The present application further provides a terminal device, wherein the terminal device includes a pressure detection structure as described above.

With the pressure detection structure and the terminal device according to the present application, a pressure sensor is fixed to a display screen, a pressure-deformable gap layer is arranged between an LED light emitting layer or a bottom plate of the display screen, such that the tolerance to be controlled mainly lies in the thickness of the gap layer inside the display screen, and the flatness of the pressure sensor. Since the pressure sensor is fixed to the display screen, the thickness of the gap layer therebetween is simply controlled. In addition, the tolerance is actually very small, and the flatness of the pressure sensor may be achieved at a high precision. Such a structure design has few factors to be controlled as compared against the prior art, is simpler to be controlled in mass production, and is not subject to impacts from assembling, falloff and extrusion-caused deformation of the entire product. Hence, the assembling tolerance is reduced, and the stability, reliability and consistency of pressure detection by the terminal device are improved.

The attainment of the objectives, functional features and advantages of the present application are further described hereinafter with reference to the specific embodiments and the accompanying drawings.

DETAILED DESCRIPTION

It should be understood that the specific embodiments described herein are only intended to explain the present application instead of limiting the present application.

Figure 2:
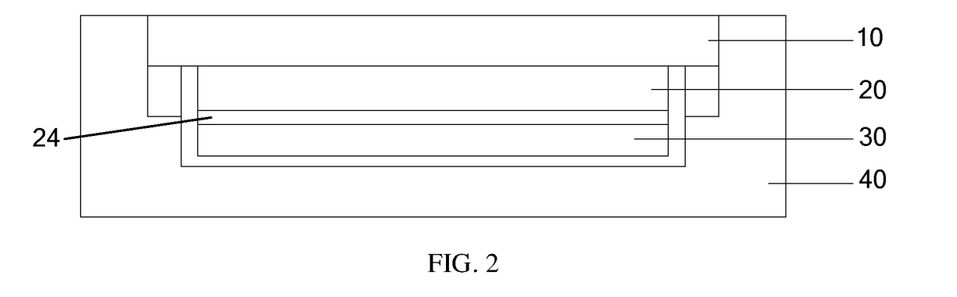
FIG. 2 is a schematic structural diagram of a pressure detection structure according to a first embodiment of the present application.
Figure 3:
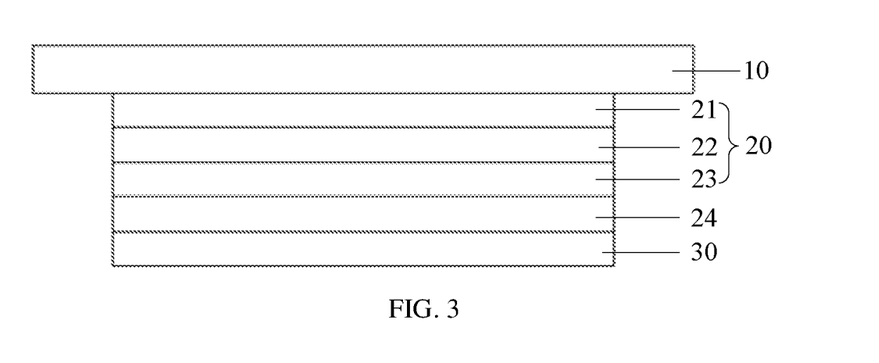
FIG. 3 is another schematic structural diagram of the pressure detection structure according to the first embodiment of the present application.

As illustrated in FIG. 2 and FIG. 3, a first embodiment of the present application provides a pressure detection structure. The pressure detection structure includes a cover 10, a display screen 20, a pressure sensor 30 and a middle frame 40. The display screen 20 and the cover 10 are sequentially stacked in the middle frame 40 from bottom to top. An edge of the cover 10 is fixed to the middle frame 40 via an adhesive or in other manner. The pressure sensor 30 is fixed to the display screen 20.

As illustrated in FIG. 3, the display screen 20 is an organic light-emitting diode (OLED) display screen, and includes a lower glass layer 23, an LED light emitting layer 22 and an upper glass layer 21 which are sequentially stacked from bottom to top; the pressure sensor 30 is positioned under the lower glass layer 23; and a pressure-deformable gap layer 24 is arranged between the pressure sensor 30 and the lower glass layer 23. In this embodiment, the gap layer 24 between the pressure sensor 30 and the lower glass layer 23 is a flexible filler layer (for example, a flexible foam), wherein the flexible filler layer is connected to the lower glass layer 23; and the pressure sensor 30 is connected to the flexible filler layer. For example, a flexible foam is arranged between the pressure sensor 30 and the lower glass layer 23, wherein one face of the flexible foam is adhered to the lower glass layer 23 via a double-faced adhesive, and the other face of the flexible foam is adhered to the pressure sensor 30 via a double-faced adhesive. For brevity, the middle frame 40 is not illustrated in the drawings of the subsequent embodiments.

Figure 4:
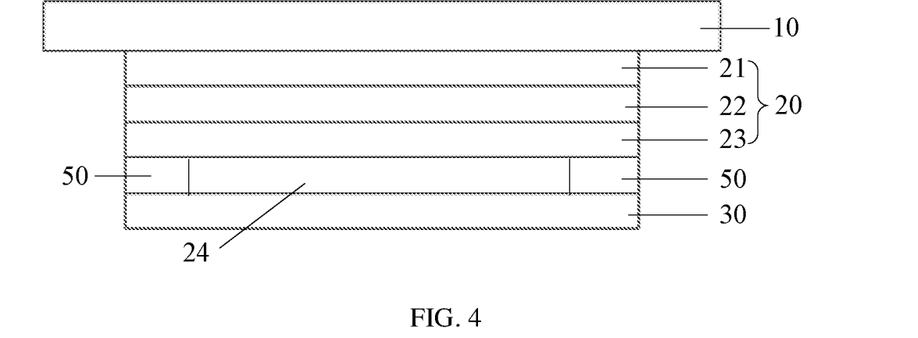
FIG. 4 is a schematic structural diagram of a pressure detection structure according to a second embodiment of the present application.

In a second embodiment as illustrated in FIG. 4, an edge of the pressure sensor 30 is adhered to the lower glass layer 23 via an adhesive 50, such that a gap is formed between the pressure sensor 30 and the lower glass layer 23, wherein the gap is the gap layer 24. The gap may be an air gap, or may be filled with a flexible elastic material.

Figure 5A:
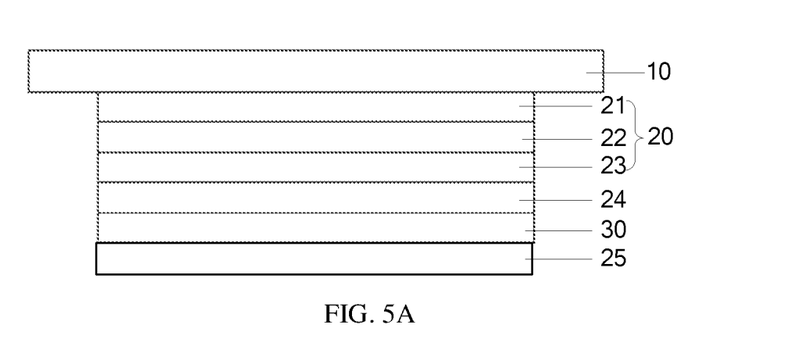
FIG. 5A is a schematic structural diagram of a pressure detection structure according to a third embodiment of the present application.
Figure 5B:
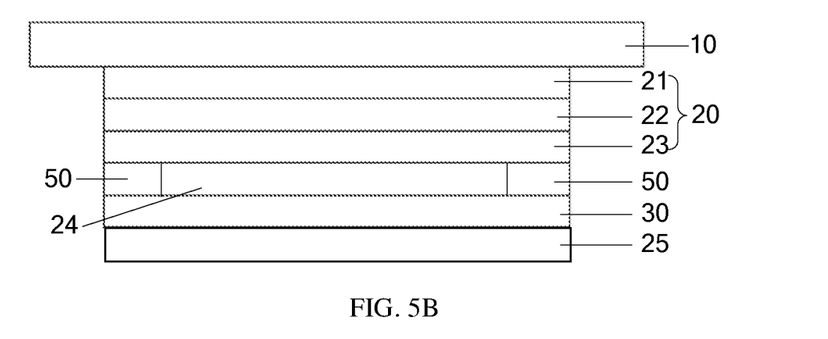
FIG. 5B is another schematic structural diagram of the pressure detection structure according to the third embodiment of the present application.

As illustrated in FIG. 5A and FIG. 5B, a bottom plate 25 may be further added to the display screen 20 based on the first or second embodiment, to construct a third embodiment. The bottom plate 25 is configured to bear the pressure sensor 30, to enhance the flatness and rigidity of the pressure sensor 30 and reduces a tolerance. The bottom plate 25 may be made from a steel or other high-rigidity material, and the bottom plate 25 may be arranged separately from the pressure sensor 30 or may be arranged integrally with the pressure sensor 30.

Figure 6:
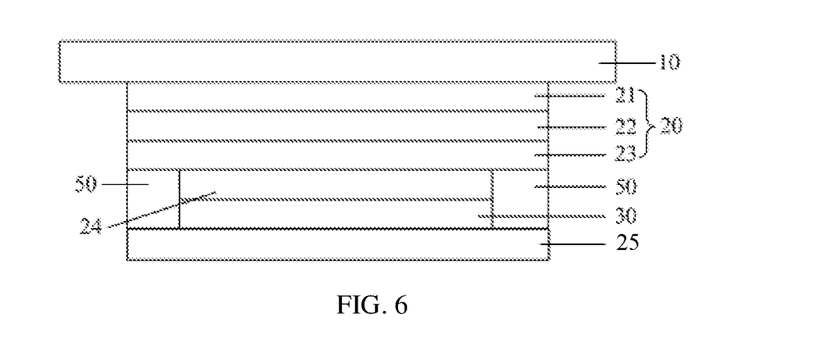
FIG. 6 is a schematic structural diagram of a pressure detection structure according to a fourth embodiment of the present application.

In a fourth embodiment as illustrated in FIG. 6, an edge of the bottom plate 25 bearing the pressure sensor 30 is adhered to the lower glass layer 23 via an adhesive 50, such that a gap is formed between the pressure sensor 30 and the lower glass layer 23, wherein the gap is the gap layer 24. The gap may be an air gap, or may be filled with a flexible elastic material.

Figure 7A:
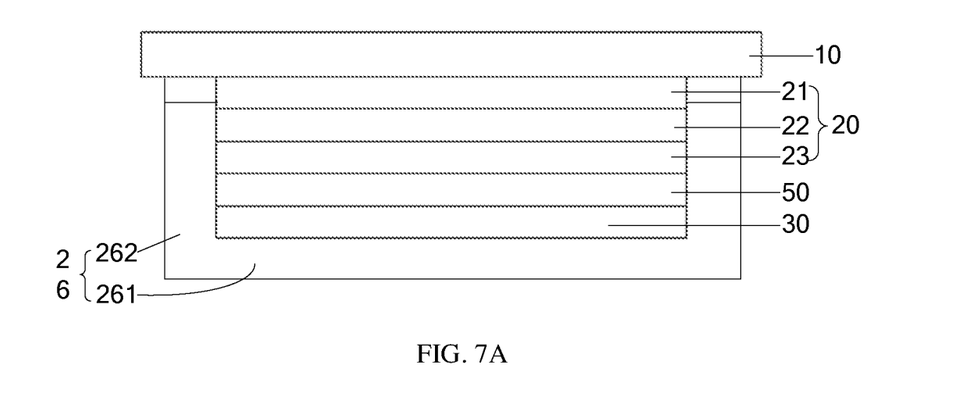
FIG. 7A is a schematic structural diagram of a pressure detection structure according to a fifth embodiment of the present application.
Figure 7B:
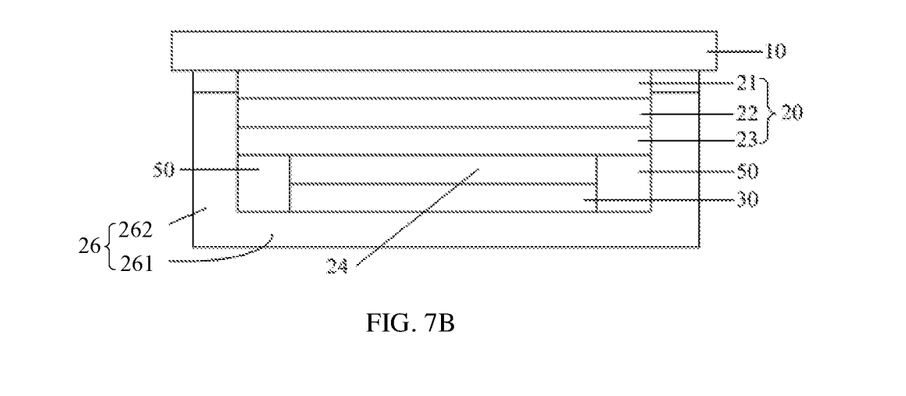
FIG. 7B is another schematic structural diagram of the pressure detection structure according to the fifth embodiment of the present application.

As illustrated in FIG. 7A and FIG. 7B, a housing 26 may be further added to the display screen 20 based on the first or second embodiment, to construct a fifth embodiment. The lower glass layer 23, the LED light emitting layer 22, the upper glass layer 21 and the pressure sensor 30 are received in the housing 26. The housing 26 includes a back shell 261 bearing the pressure sensor 30 and a support 262 connected to an edge of the back shell 261. A top of the support 262 is adhered to the cover 10 via an adhesive (or in another connection manner). The back shell 261 and the support 262 may be integrally formed, or may be assembled together upon separate formation. The back shell 261 and the support 262 may be made from a rigid metal material or may be made from a plastic or other material.

Figure 8:
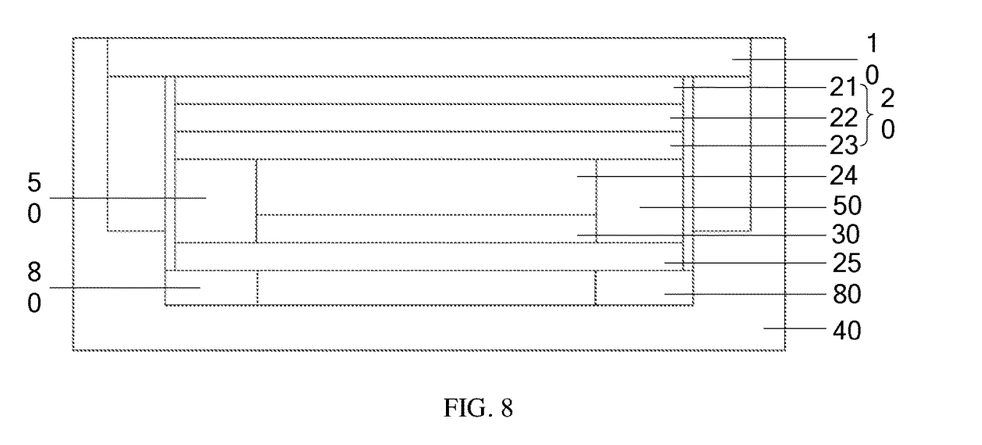
FIG. 8 is a schematic structural diagram of a pressure detection structure according to a sixth embodiment of the present application.

In a sixth embodiment, based on the first to fifth embodiments, a cushion 80 is convexly arranged on a bottom edge inside the middle frame 40, and the pressure sensor 30, the bottom plate 25 or the housing 26 is borne on the cushion 80. For example, as illustrated in FIG. 8, further improvements are made based on the second embodiment, wherein a cushion 80 is convexly arranged on a bottom edge inside the middle frame 40, and the bottom plate 25 is borne on the cushion 80. The cushion 80 may be made from an elastic material or a rigid material, and the cushion 80 may be arranged separately from or integrally with the middle frame 40. When the display screen 20 downwardly suffers from pressure, the cushion 80 in turn abuts against the bottom plate 25, such that an adhesive 50 between the bottom plate 25 and the lower glass layer 23 is compressed. Then the tolerance between different devices may be reduced or eliminated via adhesive-based fixing between the cover 10 and the middle frame 40, such that the experience difference between the devices is mitigated.

Figure 9:
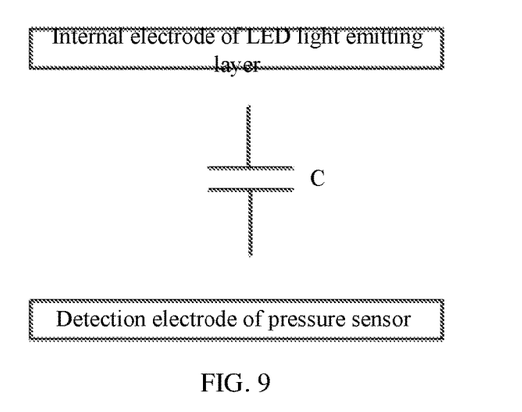
FIG. 9 is a schematic structural diagram of a capacitor according to an embodiment of the present application.

In the abovementioned embodiments, the reference electrode is the internal electrode of the LED light emitting layer 22, and a detection electrode of the pressure sensor 30 forms a capacitor with an internal electrode of the LED light emitting layer 22. The structure of the capacitor herein is as illustrated in FIG. 9. In this case, the spacing between the detection electrode of the pressure sensor 30 and the LED light emitting layer 22 is detected. When the cover 10 deforms under pressure, the gap layer 24 between the display screen 20 and the pressure sensor 30 is compressed, and thus the distance between the pressure sensor 30 and the LED light emitting layer 22 is reduced, thereby changing the capacitance to generate a corresponding pressure signal. Therefore, the tolerance to be controlled by such a structure mainly lies in the thickness of the gap layer 24 between the display screen 20 and the pressure sensor 30, and the flatness of the pressure sensor 30. Since the pressure sensor 30 is fixed to the display screen 20, the thickness of the gap layer 24 therebetween is simply controlled. In addition, the tolerance is actually very small, and the flatness of the pressure sensor 30 may be achieved at a high precision. Such a structure design has few factors to be controlled as compared against the prior art, is simpler to be controlled in mass production, and is not subject to impacts from assembly, falloff and extrusion-caused deformation of the entire product.

Figure 10:
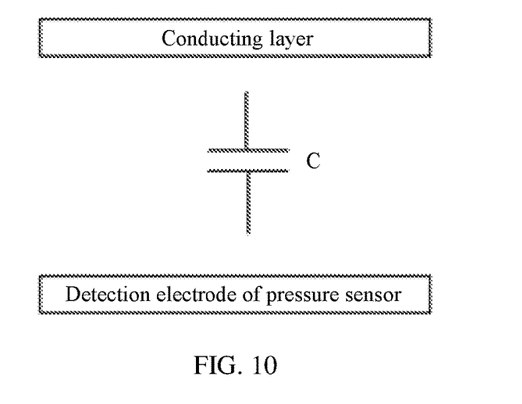
FIG. 10 is another schematic structural diagram of the capacitor according to the embodiment of the present application.

Further, the reference electrode may also not be limited to the internal electrode of the LED light emitting layer 22. Nevertheless, based on any of the above embodiments, a conducting layer may be arranged between the lower glass layer 23 and the gap layer 24, wherein the conducting layer is separate from the lower glass layer 23, or may be a conducting coating coated on the surface of the lower glass layer 23 or a conducting material added to the surface of the lower glass layer or a material with conducting particles. The structure of the capacitor herein is as illustrated in FIG. 10.

Figure 11A:
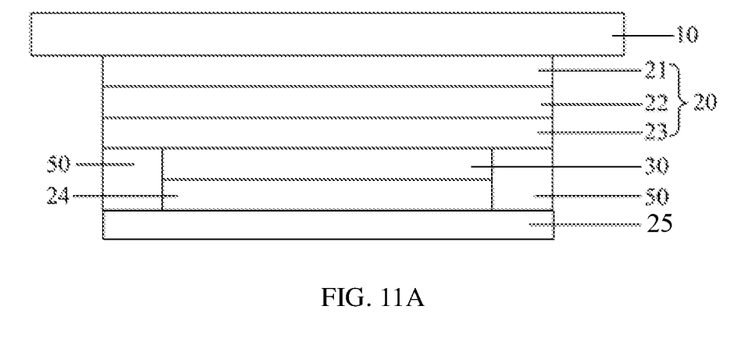
FIG. 11A is a schematic structural diagram of a pressure detection structure according to a seventh embodiment of the present application.
Figure 11B:
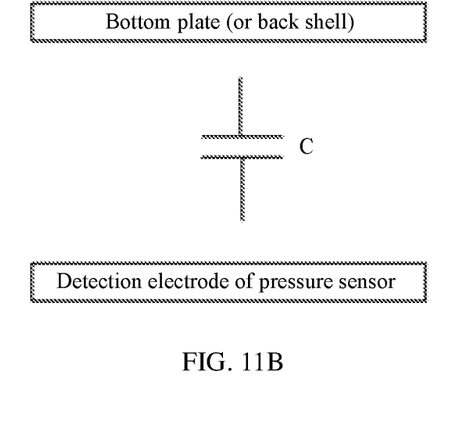
FIG. 11B is a schematic structural diagram of a capacitor according to the sixth embodiment of the present application.
Figure 11C:
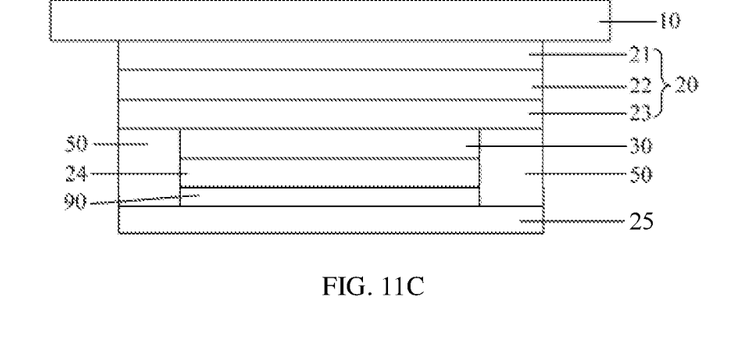
FIG. 11C is another schematic structural diagram of the pressure detection structure according to the seventh embodiment of the present application.

Particularly, based on the third to fifth embodiments above mentioned, the gap layer 24 may be formed between the pressure sensor 30 and the bottom plate 25 or the back shell 261, to construct a seventh embodiment. For example, as illustrated in FIG. 11A, the pressure sensor 30 is closely connected to the lower glass layer 23, and a gap layer 24 (air gap or flexible filler) is arranged between the pressure sensor 30 and the bottom plate 25. The bottom plate 25 is made from a conducting material (for example, a metal material). In this case, the reference electrode is the bottom plate 25 (or the back shell 261), and the structure of the capacitor is as illustrated in FIG. 11B. Also as illustrated in FIG. 11C, a conducting layer 90 is arranged on the bottom plate 25, wherein the conducting layer 90 may be a laminate separate from the bottom plate 25 or may be a coating coated on the bottom plate 25. Herein the reference electrode is the conducting layer 90. In addition, in this embodiment, a cushion 80 may also be convexly provided on a bottom edge inside the middle frame 40, as disclosed in the sixth embodiment.

With the pressure detection structure according to the present application, a pressure sensor is fixed to a display screen, a pressure-deformable gap layer is arranged between an LED light emitting layer or a bottom plate of the display screen, such that the tolerance to be controlled mainly lies in the thickness of the gap layer inside the display screen, and the flatness of the pressure sensor. Since the pressure sensor is fixed to the display screen, the thickness of the gap layer therebetween is simply controlled. In addition, the tolerance is actually very small, and the flatness of the pressure sensor may be achieved at a high precision. Such a structure design has few factors to be controlled as compared against the prior art, is simpler to be controlled in mass production, and is not subject to impacts from assembly, falloff and extrusion-caused deformation of the entire product. Hence, the assembling tolerance is reduced, and the stability, reliability and consistency of pressure detection by the terminal device are improved.

The present application further provides a terminal device, wherein the terminal device may be a mobile terminal such as a mobile phone, a tablet computer and the like, or may be a fixed terminal such as a desktop computer and the like. The terminal device includes a pressure detection structure. The pressure detection structure includes a cover, a display screen, a pressure sensor and a middle frame, the display screen and the cover being sequentially stacked in the middle frame from bottom to top; wherein the pressure sensor is fixed to the display screen; the display screen includes a lower glass layer, an LED light emitting layer and an upper glass layer which are sequentially stacked from bottom to top; and the pressure sensor is positioned beneath the lower glass layer. The pressure detection structure described in this embodiment is the pressure detection structure involved in the above embodiments of the present application, which is thus not described herein any further.

With the terminal device according to the present application, a pressure sensor is fixed to a display screen, a pressure-deformable gap layer is arranged between an LED light emitting layer or a bottom plate of the display screen, such that the tolerance to be controlled mainly lies in the thickness of the gap layer inside the display screen, and the flatness of the pressure sensor. Since the pressure sensor is fixed to the display screen, the thickness of the gap layer therebetween is simply controlled. In addition, the tolerance is actually very small, and the flatness of the pressure sensor may be achieved at a high precision. Such a structure design has few factors to be controlled as compared against the prior art, is simpler to be controlled in mass production, and is not subject to impacts from assembly, falloff and extrusion-caused deformation of the entire product. Hence, the assembling tolerance is reduced, and the stability, reliability and consistency of pressure detection by the terminal device are improved.

It should be understood that described above are merely exemplary embodiments of the present application, but are not intended to limit the scope of the present invention. Any equivalent structure or equivalent process variation made based on the specification and drawings of the present application, which is directly or indirectly applied in other related technical fields, fall within the scope of the present application.

What is claimed is:

1. A pressure detection structure, comprising:
a cover;
a display screen;
a pressure sensor; and
a middle frame;
the display screen and the cover being sequentially stacked in the middle frame from bottom to top;
wherein: the pressure sensor is fixed to the display screen; the display screen comprises a lower glass layer, an LED light emitting layer and an upper glass layer which are sequentially stacked from bottom to top; and the pressure sensor is positioned under the lower glass layer.

2. The pressure detection structure according to claim 1, wherein: a pressure-deformable gap layer is arranged between the pressure sensor and the lower glass layer.

3. The pressure detection structure according to claim 2, wherein: the gap layer is a flexible filler layer, the flexible filler layer being connected to the lower glass layer; and the pressure sensor is connected to the flexible filler layer.

4. The pressure detection structure according to claim 2, wherein: an edge of the pressure sensor is adhered to the lower glass layer, the gap layer is a gap formed between the pressure sensor and the lower glass layer.

5. The pressure detection structure according to claim 2, wherein: the display screen further comprises a bottom plate bearing the pressure sensor, an edge of the bottom plate being adhered to the lower glass layer; and the gap layer is a gap formed between the pressure sensor and the lower glass layer.

6. The pressure detection structure according to claim 2, wherein: the display screen further comprises a bottom plate bearing the pressure sensor.

7. The pressure detection structure according to claim 3, wherein: the display screen further comprises a bottom plate bearing the pressure sensor.

8. The pressure detection structure according to claim 4, wherein: the display screen further comprises a bottom plate bearing the pressure sensor.

9. The pressure detection structure according to claim 2, wherein: the display screen further comprises a housing, the housing comprising a back shell bearing the pressure sensor and a support connected to an edge of the back shell, the support being connected to the cover.

10. The pressure detection structure according to claim 3, wherein: the display screen further comprises a housing, the housing comprising a back shell bearing the pressure sensor and a support connected to an edge of the back shell, the support being connected to the cover.

11. The pressure detection structure according to claim 4, wherein: the display screen further comprises a housing, the housing comprising a back shell bearing the pressure sensor and a support connected to an edge of the back shell, the support being connected to the cover.

12. The pressure detection structure according to claim 2, wherein: a conducting layer is arranged between the lower glass layer and the gap layer.

13. The pressure detection structure according to claim 3, wherein: a conducting layer is arranged between the lower glass layer and the gap layer.

14. The pressure detection structure according to claim 4, wherein: a conducting layer is arranged between the lower glass layer and the gap layer.

15. The pressure detection structure according to claim 5, wherein: a conducting layer is arranged between the lower glass layer and the gap layer.

16. The pressure detection structure according to claim 12, wherein: the conducting layer is a conducting coating coated on a surface of the lower glass layer.

17. The pressure detection structure according to claim 13, wherein: the conducting layer is a conducting coating coated on a surface of the lower glass layer.

18. The pressure detection structure according to claim 1, wherein: the display screen further comprises a bottom plate, an edge of the bottom plate being adhered to the lower glass layer; the pressure sensor is connected to the lower glass layer; a pressure-deformable gap layer is arranged between the pressure sensor and the bottom plate; and the bottom plate is a conductor or the bottom plate is provided with a conducting layer.

19. The pressure detection structure according to claim 2, wherein: a cushion is convexly arranged on a bottom edge inside the middle frame.

20. A terminal device, comprising a pressure detection structure, the pressure detection structure comprising:
    a cover;
    a display screen;
    a pressure sensor; and
    a middle frame;
    the display screen and the cover being sequentially stacked in the middle frame from bottom to top;
    wherein: the pressure sensor is fixed to the display screen; the display screen comprises a lower glass layer, an LED light emitting layer and an upper glass layer which are sequentially stacked from bottom to top; and the pressure sensor is positioned beneath the lower glass layer.

* * * * *